United States Patent [19]
Woods et al.

[11] 3,815,006
[45] June 4, 1974

[54] SYSTEM TO DEENERGIZE MOTOR RESPONSIVE TO CURRENT

[75] Inventors: Richard E. Woods, Markle; William H. Hohman, Bluffton, both of Ind.

[73] Assignee: Franklin Electric Co., Inc., Bluffton, Ind.

[22] Filed: July 14, 1972

[21] Appl. No.: 271,920

[52] U.S. Cl. ............... 318/474, 318/473, 317/13 C
[51] Int. Cl. ........................................... H02p 1/04
[58] Field of Search........... 317/13 C; 318/474, 471, 318/473

[56] References Cited
UNITED STATES PATENTS

| | | | |
|---|---|---|---|
| 2,619,526 | 11/1952 | Willman | 318/563 X |
| 2,754,464 | 7/1956 | Wizenez et al. | 318/474 X |
| 3,111,613 | 11/1963 | Harper, Jr. et al. | 318/563 |
| 3,321,641 | 5/1967 | Howell | 318/473 X |
| 3,404,313 | 10/1968 | Happel et al. | 318/473 X |
| 3,575,647 | 4/1971 | Krieger | 317/13 C |
| 3,581,179 | 5/1971 | Jones | 317/13 R |
| 3,688,157 | 8/1972 | Spears | 317/13 R |
| 3,111,613 | 11/1963 | Harper, Jr. et al. | 318/563 |

*Primary Examiner*—T. E. Lynch
*Attorney, Agent, or Firm*—Hibben, Noyes & Becknell

[57] ABSTRACT

This disclosure deals with a telemetry system adapted to be coupled to power transmission lines, the system generating pulses at one location on the lines and detecting such pulses at another location. The system is designed for use with transmission lines carrying alternating current from a power supply to a plurality of loads connected in parallel branch lines, and includes one or more pulse generators, each of which is associated with one load and, when energized, generates a series of pulses. The system also includes one or more pulse detectors each of which is coupled by current transformer means to branch lines leading to a load. The impedance of the power supply is much less than that of each of the loads, and therefore pulses generated on one of the branch lines are not sensed by detectors on the other branch lines because the supply serves as a low impedance shunt path across the other branch lines.

21 Claims, 5 Drawing Figures

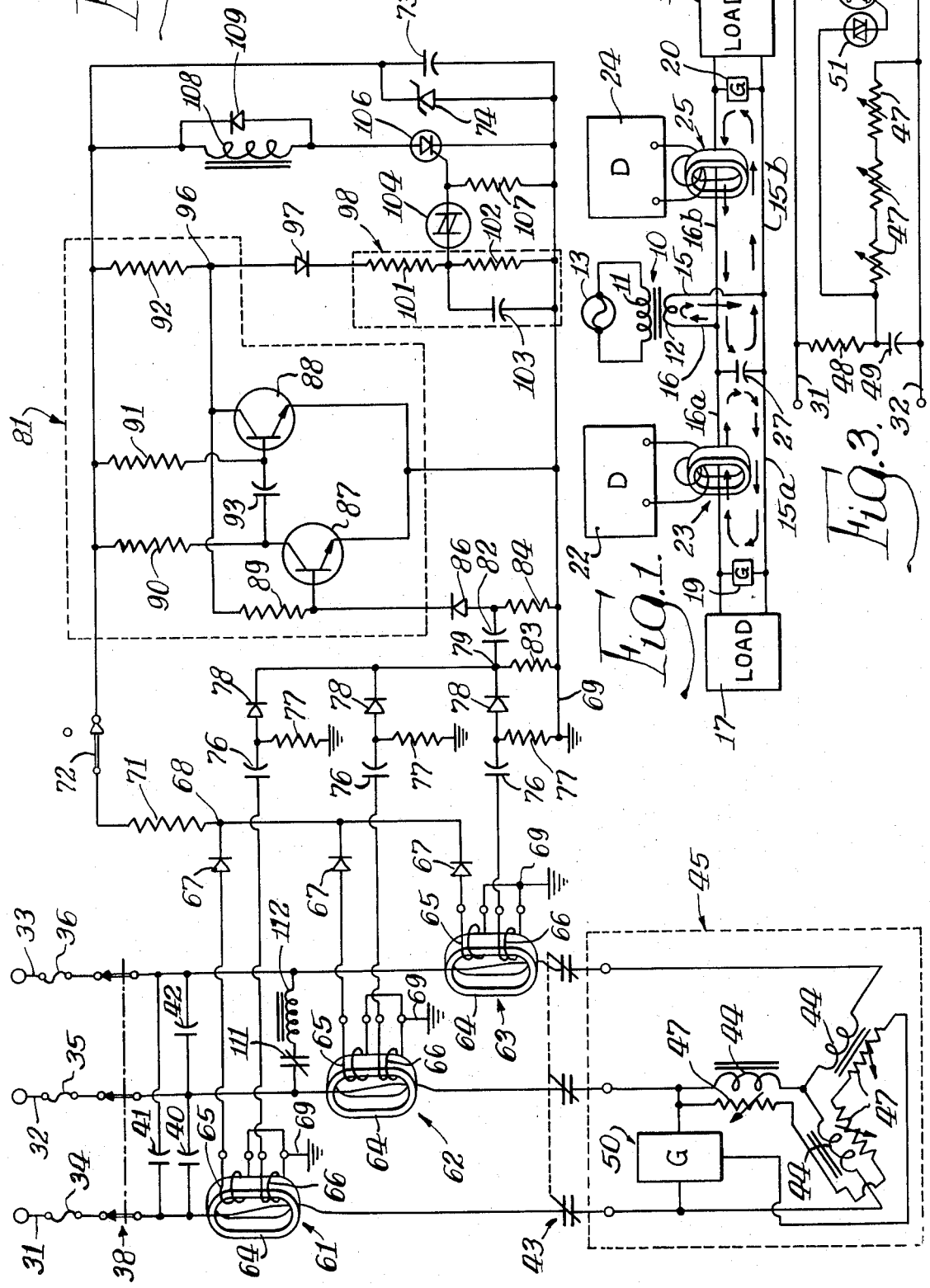

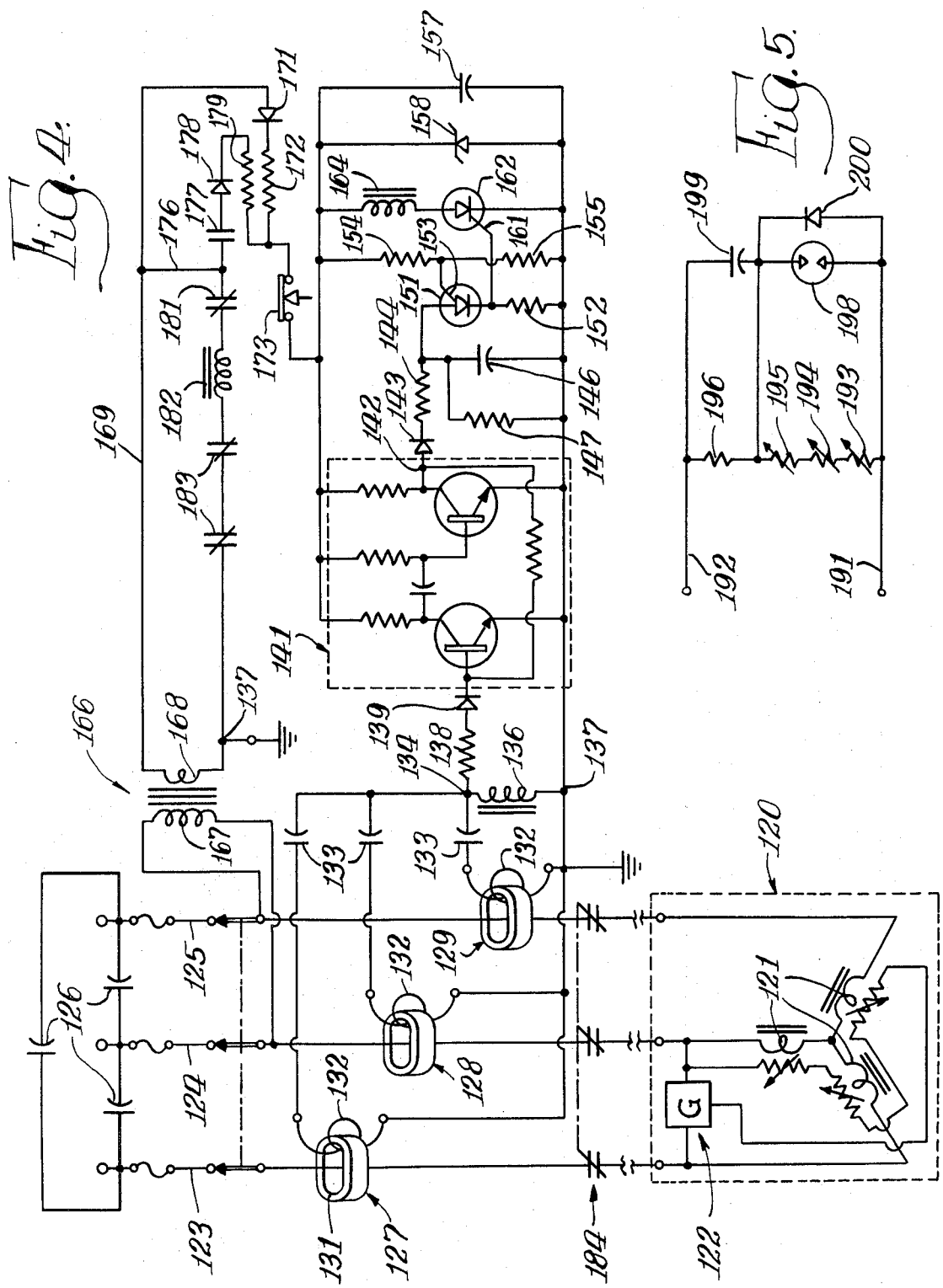

SYSTEM TO DEENERGIZE MOTOR RESPONSIVE TO CURRENT

Telemetry systems have been devised, which utilize the transmission lines of AC power apparatus for transmission of signals. For example, R. E. Woods U.S. Pat. No. 3,594,584 dated July 20, 1971, discloses such a system wherein a pulse generator or transmitter is connected across two power lines supplying an AC load. A pulse detector is also connected across the lines and receives the pulses. In one use for such a system, the load is a motor and the pulse generator includes a heat sensitive element, the generator producing voltage pulses to signal an overheated condition of the motor. The detector responds to the voltage pulses on the lines and disconnects the motor from the power lines.

Such a system operates well when there is only one generator and one detector connected to the power lines. However, if a number of loads are operated from a common power apparatus, and each load has a generator and a detector associated with it, the voltage pulses appear at all of the detectors, and each detector responds to pulses generated by any of the generators. All of the loads would have to be disconnected to protect a single overheated load.

To remedy this situation, a telemetry system has been provided as disclosed in the J. A. Whitney et al U.S. application Ser. No. 161,530, filed July 12, 1971, and entitled "Phase Selective Telemetry System." In that system, each generator of the telemetry system provides phase coded signals, and a similarly coded detector is associated with each generator. A disadvantage of such a system is that careful records must be kept of the phase coding of the generators and of the detectors so that the proper detector will be used with each generator.

It is a general object of the present invention to provide a telemetry system wherein a number of similar generators and a number of similar detectors may be connected to a common power apparatus but each detector will respond only to an associated generator.

In accordance with the present invention there is provided a telemetry system for use with AC power apparatus including a power supply, power lines leading from the supply, and a plurality of loads, each load being connected in a branch of the power lines and the branches being connected in parallel. The telemetry system includes a novel pulse generator connected to generate current pulses on one of said branches, and a novel pulse detector coupled by one or more current transformers to said one branch. Current pulses produced by the generator in the branch induce voltage signals in the current transformers, and the detector responds to the signals. The impedance of the power supply is much less than that of the loads, and therefore the power supply serves as a low impedance path for the pulses. Most of the current of the pulses therefore flows through the power supply, thus substantially preventing the pulses from appearing in the other branches. A shunting capacitor may also be connected across the lines on the supply side of the detector to ensure that there is a low impedance path for the pulses.

Other objects, features and advantages of the present invention will become apparent from the following detailed description taken in conjunction with the accompanying figures of the drawings, wherein:

FIG. 1 is a schematic diagram of electrical apparatus including a telemetry system embodying the invention;

FIG. 2 is a schematic diagram of a detector of the telemetry system;

FIG. 3 is a schematic diagram of a generator of the system;

FIG. 4 is a schematic diagram similar to FIG. 2 but illustrating another form of detector;

FIG. 5 is a schematic diagram similar to FIG. 3 but showing another form of generator.

The apparatus illustrated in FIG. 1 includes a power supply transformer 10 including a primary winding 11 and a secondary winding 12. The primary winding 11 is connected to an AC power source 13 and the secondary winding 12 is connected to two power distribution lines 15 and 16. Two loads 17 and 18, such as induction motors, are connected in parallel branch lines 15a, 16a, 15b and 16b of the lines 15 and 16. In addition, pulse transmitters or generators 19 and 20 are connected across the branch lines and are respectively associated with the loads 17 and 18. The generators 19 and 20 may, for example, include heat sensitive elements connected in heat transfer relation with the loads and be adapted to generate pulses if the loads overheat. A first detector 22 including a current transformer 23 is coupled to the branch line 16a, and a second detector 24 including another current transformer 25 is coupled to the line 16b. Each of the current transformers 23 and 25 includes a core which encircles the associated branch line, and a secondary winding which is inductively coupled to the associated core and has a voltage signal induced therein by the occurrence of a current pulse on the branch line. In the present example, a shunting capacitor 27 is also connected across the branch lines 15a and 16a between the current transformers 23 and 25.

Briefly, if the generator 19, for example, is energized and generates current pulses in response to, for example, an overheated condition of the load 17, the current pulses travel through the branch lines 15a and 16a and are sensed by the detector 22. If shunting capacitor 27 were not provided, such current pulses would pass through the secondary winding 12 of the supply transformer 10. The impedance of the winding 12 is very low compared with the impedance of the two loads 17 and 18, and consequently while a strong current pulse appears at the current transformer 23, a negligibly small current pulse appears at the other current transformer 25 and load 18 because most of the current of the pulse flows through the supply transformer. With the shunting capacitor 27 connected in the circuit, the capacitor 27 provides an additional low impedance shunting path which limits the magnitude of a current pulse received at the current transformer 25 to a very small value. The frequency of the pulses is approximately 50 Kc to 100 Kc, and the shunting capacitor 27 has little impedance at such frequencies. The capacitor 27 may, for example, be .05 MFD at 4 KV. There may be a very small current pulse received at the transformer 25 due to a fluctuation of the supply voltage during a pulse generated by the generator 19, but the pulse at the transformer 25 will be negligibly small, and the detector 24 will not respond to it. Similarly, the detector 22 will not respond to pulses generated by the generator 20 for the same reasons. Consequently, the generators 19 and 20 may have identical constructions and the detectors 22 and 24 may have identical constructions.

While the invention is illustrated in FIG. 1 in connection with a two wire power system, a telemetry system embodying the invention is illustrated in FIG. 2 in connection with a three wire power system. It will be apparent that the foregoing principles of operation of the invention are equally applicable to both types of power systems. For simplicity, FIG. 2 illustrates only one branch (one load) in the plural load system of FIG. 1. The apparatus shown in FIG. 2 includes three branch lines 31, 32 and 33 which are adapted to be connected to the secondary of a three-phase supply transformer (not shown). The lines 31 to 33 are respectively connected to fuses 34 to 36 and to a disconnect switch 38. A delta arrangement of three shunting capacitors 40, 41 and 42 are connected between the three lines 31 to 33, these capacitors performing the same function as the capacitor 27 (FIG. 1). In addition to that function, the capacitors 40 to 42 also serve to provide a pulse path in the event power is lost in one phase, as by a line fuse 34 to 36 blowing or a phase being lost at the power supply.

The three power lines 31 to 33 are connected through normally closed latch-in relay contacts 43 to the three phase windings 44 of a load 45 such as an AC motor. A pulse generator 50 associated with the load 45 includes three heat sensitive elements which, in the present illustration, are three PTC resistors 47. The three PTC resistors are connected in series and each of the PTC resistors is mounted in the load 45 in heat conducting relation with one of the windings 44.

The details of one form of generator 50 are shown in FIG. 3, and it further includes a resistor 48 and a capacitor 49 which are serially connected across the two power lines 31 and 32. The three PTC resistors 47 are connected in series across the capacitor 49, and the junction between the resistor 48 and the capacitor 49 is also connected through a DIAC 51 to the gate of a TRIAC 52. The TRIAC 52 and the DIAC 51 together form a breakdown device which fires and conducts current at a breakdown voltage. A diode 53 is connected across the TRIAC 52, and a capacitor 54 is connected in series with the TRIAC 52, the capacitor 54 and the TRIAC 52 also being connected across the lines 31 and 32.

In the operation of the generator 50, resistance of the three PTC resistors 47 when the motor is operating at normal temperature is relatively low, in the neighborhood of 3,000 ohms at 25° C. When the critical temperature of approximately 110° to 120° C is reached, the resistance of each PTC resistor rises to approximately 50,000 ohms. The resistors 47 and 48 form a voltage divider, and in normal operation, the voltage across capacitor 49 is below the firing voltage of DIAC 51, this firing voltage being the breakdown voltage of the breakdown device. The rise in the resistance of the PTC resistors which occurs when the load overheats causes the voltage across the capacitor 49 to rise at each peak of line voltage to the value where the DIAC 51 fires. A current pulse due to the discharge of the capacitor 49 flows to the gate of the TRIAC 52 and triggers the TRIAC 52 into conduction. Even though the TRIAC 52 receives triggering current on each half cycle of the line voltage, it fires only during the positive half cycle due to the diode 53. The capacitor 54 is charged to peak line voltage due to the current flow through the diode 53 during each negative half cycle, assuming that the conductor 32 is at ground potential, and the TRIAC 52 is triggered near the peak of each positive half cycle. Consequently, a strong current pulse is generated on the power lines 31 and 32 by the discharge of the capacitor 54 in each positive half cycle. The TRIAC 52 of course is turned off the next time the AC wave passes through zero.

With reference again to FIG. 2, a current pulse generated on the lines 31 and 32 by the generator 50 passes through the closed contacts 43 and through the capacitors 40 to 42. The pulse also appears at the secondary winding of the supply transformer connected to the lines 31 to 33 as previously explained. Such current pulses are detected by three current transformers 61 to 63 which are inductively coupled with the line 31 to 33, respectively. The low impedance of the capacitors 40 to 42 ensures that a relatively large voltage signal is induced in the current transformers. While the transmitter is connected only across the lines 31 and 32, it is advantageous to provide a current transformer for each of the power lines 31 to 33 to make certain that a current transformer is connected across the lines on which the pulses are generated, and to make certain that the telemetry system will operate during single phasing motor operation.

Each of the current transformers includes a core 64 and two secondary windings 65 and 66. The windings 65 are connected in non-cancelling mode and are provided to obtain power for operating the detector, and the windings 66 are provided to sense the current pulses. Each of the windings 65 has one terminal connected to ground 69 and its other terminal connected through a diode 67 to a junction 68, and consequently rectified DC appears between the point 68 and ground 69. The point 68 is connected by a current limiting resistor 71 and a manually operable override switch 72 to a storage capacitor 73. A Zener diode 74 is connected across the capacitor 73, and regulates the voltage across the capacitor 73 at, for example, 15 volts DC.

Each of the other secondary windings 66 of the three current transformers is connected to a capacitor 76, a resistor 77 and a diode 78 to another junction point 79. The inductances of the windings 66, the capacitors 76 and the resistors 77 form a high pass filter which passes the pulses but removes the 60 hertz line frequency. The diodes 78 rectify the pulses and ensure that only the positive parts of the pulses appear at the junction point 79.

Each of the current transformers includes, in the present example, the winding 65 having 4,000 turns and the winding 66 having 100 turns. The capacitors 76 are .0025 MFD at 50 volts DC, and the resistors 77 are each 4.7 K ohm resistors. Instead of providing a high pass filter as shown in FIG. 2, a filter as shown in FIG. 4 could be provided or a transformer core material could be used which would block the line frequency. In addition to the important function of sensing pulses, the transformers 61 to 63 are also advantageous in that they serve to isolate the detector circuit from the line voltage.

The junction point 79 is capacitively coupled by a capacitor 82, resistors 83 and 84, and by a blocking diode 86 to the input of a pulse shaping circuit such as a monostaple multivibrator 81. The resistor 83 is connected between the point 79 and ground 69, and the capacitor 82 and the resistor 84 are serially connected across the resistor 83. The diode 86 is connected between the juncture of the capacitor 82 and the resistor 84 to the base of a transistor 87 of the multivibrator 81. The multivibrator 81 circuit further includes another transistor 88, four resistors 89, 90, 91 and 92, and a capacitor 93, the foregoing components being connected in a conventional arrangement to form a one-shot or monostable multivibrator 81. The multivibrator 81 serves to produce a signal having a fixed width and amplitude for each signal received at its input. A signal at the point 79 must, however, have greater than a predetermined magnitude to trigger the multivibrator 81. This magnitude is determined by the diode 86 drop plus the base to emitter junction drop of the transistor 87, and may, for example, be 1.4 volts DC.

The output of the multivibrator 81 appears at a point 96, and a blocking diode 97 connects the point 96 to an integrating network 98 including two resistors 101 and 102 and a capacitor 103. The diode 97, the resistor 101 and the resistor 102 are connected in series between the point 96 and ground 69, and the capacitor 103 is connected across the resistor 102. The resistor 102 is provided to bleed off any DC charge on the capacitor 103 due, for example, to starting switching transients or random line noise. The integrating circuit 98 integrates the output of the multivibrator 81 until the voltage across the capacitor 103 reaches the breakdown voltage of a DIAC 104 connected to the capacitor 103. To ensure that the breakdown voltage will not be reached in response to transients or noise signals, the circuit component values are chosen to require a substantial number, such as sixty, multivibrator pulses in succession to raise the capacitor 103 voltage to the breakdown voltage. Breakdown of the DIAC 104 results in firing of an SCR 106 which has its gate connected to the DIAC 104. A gate transient suppression resistor 107 is connected between the gate of the SCR 106 and ground 69 to prevent self-activation of the SCR. When the SCR 106 is triggered into conduction, current flows through a relay coil 108 connected in series with it. The coil 108 also has a diode 109 connected across it to protect the SCR 106 by shorting out any counter EMF occurring when the circuit opens. The Zener diode 74 and the capacitor 73 of the detector power supply are connected across the coil 108 and across the multivibrator 81 to power these components.

The relay coil 108, when energized, opens normally closed relay contacts 111 which are connected across the two power lines 32 and 33 and in series with another relay coil 112. The coil 112 in turn controls the normally closed relay contacts 43. Thus, during normal circuit operation, the closed contacts 111 result in energization of the relay coil 112 and closure of the contacts 43. However, when the detector circuit receives a certain number of current pulses from the generator 50, the relay coil 108 is energized and the contacts 111 are opened. The coil 112 is therefore de-energized and the contacts 43 are opened, thereby disconnecting the load 45 from the power lines 31 to 33. It is necessary for the relay contacts 43 to be of the latching type which will remain open until reset, as by a manual operation, upon de-energization of the coil 112 because power to the detector is lost as soon as the contacts 43 open.

The system shown in FIG. 4 is generally similar to that shown in FIG. 2 and also includes a load 120, such as a motor, having three phase windings 121 connected to power lines 123 to 125. A pulse generator 122 is connected across the power lines 123 and 124, and this generator may be the same as the generator shown in FIG. 3. When energized, the generator 122 generates pulses on the two power lines 123 and 124, and these current pulses are sensed by two current transformers 127 and 128 coupled to the lines 123 and 124. Again, a current transformer 129 is preferably also connected across the third power line 125 even though pulses are not generated in the line 125. Shunting capacitors 126 are again connected across the lines 123 to 125. Each of the current transformers 127 to 129 includes a core 131 which encircles the associated power line and a secondary winding 132 which is inductively coupled to the core 131. The windings 132 are connected through capacitors 133 to a junction point 134 which is connected by a coil 136 to ground 137. The three capacitors 133 and the coil 136 form a high pass filter which passes the relatively high frequency signals due to pulses on the lines 123 to 125 but attenuate or block the line frequency. The point 134 is connected by a current limiting resistor 138 and a blocking diode 139 to the input of a monostable multivibrator 141 which operates similarly to the multivibrator 81 shown in FIG. 2. Again, the pulses must have greater than a predetermined minimum value in order to trigger the multivibrator 141. The output of the multivibrator 141 appears at a point 142 which is connected by a blocking diode 143 and a resistor 144 to an integrating network which includes a capacitor 146 and a resistor 147. The resistor 147 is connected across the capacitor 146 and bleeds off any charge which accumulates on the capacitor 146 due to noise voltages or transients. The values of the resistors 144 and 147 and the capacitor 146 determines the time constant and therefore the number of signals necessary to trigger the detector.

The capacitor 146 is connected across the input of a trigger circuit including a programmable unijunction transistor 151 which is connected in series with a resistor 152 and across the capacitor 146. The gate 153 of the transistor 151 is connected to a voltage divider including two resistors 154 and 155. The resistors 154 and 155 are serially connected across a power supply which includes a storage capacitor 157 and a Zener diode 158. The transistor 151 fires when the voltage on its anode is, in the present example, .7 volt in excess of its gate voltage. In the present example, the supply voltage is 22 volts DC and the gate voltage is 11 volts. The capacitor 146 voltage reaches 11.7 volts only after the accumulation of a number of output signals from the multivibrator 141. Upon triggering of the transistor 151, the capacitor 146 discharges through the transistor 151 and supplies triggering current to the gate 161 of an SCR 162. The SCR 162 is connected in series with a relay coil 164 and across the storage capacitor 157 of the detector power supply.

The power supply further includes a transformer 166 which has its primary winding 167 connected across the lines 124 and 125 and its secondary winding 168 connected between ground 137 and a conductor 169. The conductor 169 is connected to the capacitor 157 by a diode 171, a resistor 172 and a manually operable override switch 173, and power is normally supplied to the storage capacitor 157 during detector standby conditions by current flow through the path including the diode 171 and the resistor 172. The conductor 169 is also connected by a line 176, a normally open relay contact 177 of the relay coil 164, a diode 178 and a resistor 179 to the juncture of the resistor 172 and the switch 173. The relay coil 164 also includes normally closed relay contacts 181 which are connected between the line 176 and another relay coil 182 and ground 137. Additional normally closed cut out contacts 183 may be provided in the line between the coil 182 and the ground 137. The coil 182 controls the operation of normally closed relay contacts 184 which are connected in the lines 123 to 125 between the load 120 and the current transformers 127 to 129.

As previously mentioned, during standby operation of the detector, current flows through the diode 171 and the resistor 172 to the storage capacitor 157 and the diode 158, thereby providing a regulated power supply. When pulses appear on the lines 123 and 124, due to the energization of the pulse generator 122, such pulses are sensed by the current transformers 127 and 128 and voltage signals are induced in the secondary windings 132 of the current transformers. The voltage signals appear at the point 134 and each signal triggers the multivibrator 141. The multivibrator 141 provides a signal of fixed width and amplitude for each pulse appearing on the lines 123 and 124, and the signals from the output of the multivibrator 141 are integrated by the capacitor 146. When the integrated voltage reaches the firing voltage of the transistor 151, it fires and triggers the SCR 162 into conduction. Current then flows through the relay coil 164 resulting in closing of the contacts 177 and opening of the contacts 181. Upon opening of the contacts 181, the relay coil 182 is de-energized and the relay contacts 184 are opened, and therefore the load 120 is disconnected from the power supply. Closing of the contacts 177 results in current flow from the conductor 169 and through the diode 178 and the resistor 179, thus providing sufficient current to the capacitor 157 to maintain the relay coil 164 energized. The detector circuit will remain in this condition even though the contacts 184 are open because the transformer 166 primary winding is connected to the lines 124 and 125 ahead of the contacts 184. The detector circuit may be manually reset by pushing the switch 173 to its open position, thereby interrupting current flow to the storage capacitor 157. As soon as the coil 164 is de-energized, the contacts 184 again close and, assuming that manually operable disconnect switches 186 have not been opened, the load 120 will again be connected to the main power supply.

FIG. 5 illustrates another form of pulse generator which is generally similar to but less expensive and more reliable than the generator shown in FIG. 3. The generator of FIG. 5 is adapted to be connected across two AC power transmission lines by conductors 191 and 192, conductor 191 being connected to the ground conductor. Three heat sensitive variable impedance elements 193, 194 and 195, which in the present instance are PTC resistors, and an ordinary resistor 196 are connected in series across the conductors 191 and 192. A breakdown device in the form of a spark gap device 198 is connected in parallel with the three elements 193 to 195, one electrode of the device 198 being connected to the conductor 191. A capacitor 199 is connected in series with the device 198, the capacitor 199 being connected to the other electrode of the device 198 and to the conductor 192. Further, a diode 200 is connected across the device 198 with its polarity such that it conducts current from the conductor 191 to the conductor 192 during negative half cycles. Similarly to the three resistors 47, the three elements 193 to 195 are located in close heat transfer relation with the windings of a load.

At normal operating temperatures of the load, the resistance of each of the three elements 193 to 195 is low. The device 198 is sized such that its breakdown voltage is greater than the potential across the three elements at the peak voltage in each AC cycle when the elements 193 to 195 are operating in their low resistance mode. This potential is of course determined by the line voltage and by the value of the resistor 196 relative to the sum of the resistances of the elements 193 to 195 at low temperature operation. When the conductor 192 is negative relative to the ground conductor 191, the capacitor 199 charges through the diode 200. During the positive half cycle, the capacitor is prevented from discharging because the diode 200 is reverse biased and the device 198 does not fire.

If the load associated with the elements 193 to 195 overheats, one or more of the elements is heated to the point where it operates in its high resistance mode. The device 198 is sized so that its breakdown voltage is less than the potential across the elements 193 to 195 when one or more of these elements is operating in its high resistance mode. The potential across the three elements 193 to 195 and across the device 198 rises to above the breakdown voltage at approximately the peak of the positive half cycle, causing the device 198 to fire. The capacitor 199 thereupon discharges through the device 198, resulting in a current pulse appearing on the transmission lines. The capacitor 199 discharges until the potential across the device 198 falls to its extinguishing voltage, at which time it ceases to conduct. Thus, during overheated operation of the load, the device 198 fires and a current pulse appears on the transmission lines during the positive half wave of each AC cycle.

While the elements 47 of FIG. 3 and the elements 193 to 195 of FIG. 5 are preferably PTC resistors, other heat sensitive variable capacitors or resistors having a negative temperature coefficient could be used. In the latter instance the circuit would of course have to be arranged to respond to a decrease in resistance. The use of PTC resistors is preferred because of their sharp transition from the low resistance mode to the high resistance mode of operation. In both FIGS. 3 and 5, the PTC resistors are arranged to be heated to their high resistance mode by the load windings and they cannot be so heated by self heating due to line current flowing through them.

It will therefore be apparent that a novel and useful telemetry system has been provided. The generator of the system is uncomplicated and reliable and produces strong pulses in response to, for example, an overheated condition of a load. The detector, being coupled by current transformers to the transmission lines senses only pulses generated on the same transmission line branch to which the detector is coupled because of the low impedance shunt formed by either the main power supply or the shunting capacitors, or both. The current transformers serve the further highly important advantage of isolating the detector from the high voltage of the lines.

We claim:

1. A telemetry system for use in AC power apparatus including a power supply, power lines leading from said supply, and a plurality of loads, said loads being connected in parallel branch lines extending from said power lines, said telemetry system comprising generator means adapted to be connected to one of said branch lines and to generate pulses thereon, and detector means for detecting said pulses, said detector means including current transformer means adapted to be inductively coupled to the conductors of said one branch line and to have a signal induced therein by each of said pulses, and signal responsive means connected to said current transformer means and responding to said signals.

2. A system as in claim 1, wherein said power supply has a relatively low impedance compared to the impedance of each of said loads.

3. In AC power apparatus including a power supply, power lines leading from said supply, a plurality of loads, said loads being connected by said lines to said power supply, and generator means for generating pulses on said lines, the improvement of detector means for detecting said pulses, said detector means comprising current transformer means adapted to be inductively coupled to the conductors of said line and to have a signal induced therein by each of said pulses, and signal responsive means connected to said current transformer means and responding to said signals.

4. A system as in claim 3, wherein said detector means further includes limiting means for preventing said detector from responding to signals having a magnitude smaller than a predetermined value.

5. A system as in claim 3, wherein said detector further includes a shunting capacitor adapted to be connected across said conductors of said branch line on the power supply side of said current transformer means.

6. A system as in claim 3, wherein said detector means further includes integrating means responsive to said signals, and trigger means connected to said integrating means and being triggered when the integral of said signals reaches a predetermined value.

7. A system as in claim 6, wherein said detector means further includes signal shaping means connected between said current transformer means and said integrating means and producing a signal having a substantially fixed amplitude and width for each of said pulses.

8. A system as in claim 3, and further including power means for said detector means, said power means being coupled to said conductors.

9. A system as in claim 3, and further including power means for said detector means, said power means including current transformer means coupled to said conductors.

10. A system as in claim 9, wherein said current transformer means of said power means and said current transformer means of said detector means are parts of the same structure.

11. A system as in claim 3, wherein said pulses have a relatively high frequency, and said detector means further includes a high pass filter connected ahead of said signal responsive means for passing said signals but blocking the AC power frequency.

12. In a telemetry system for generating pulses in AC power apparatus including an AC supply, a load and at least two conductors connecting said load to said supply, the improvement of a generator for generating pulses on said conductors, comprising switch means and a first capacitor connected in series and adapted to be connected across said conductors, said switch means including a gate which closes said switch means in response to the receipt of an electrical signal, trigger means connected to said gate and passing a signal to said gate when the voltage across said trigger means reaches a predetermined value, a second capacitor adapted to be charged by the voltage on said conductors and connected to said trigger means, and variable impedance means connected to said second capacitor for varying the charge on said second capacitor.

13. Apparatus as in claim 12, wherein said variable impedance means is connected across said second capacitor.

14. Apparatus as in claim 12, wherein said variable impedance means comprises at least one PTC resistor mounted in heat conducting relation with said load.

15. Apparatus as in claim 12, wherein said variable impedance means comprises a fixed resistor and at least one variable resistor, said resistors being adapted to be connected across said conductors, and said variable resistor being connected across said first capacitor.

16. In a telemetry system for generating pulses in AC power apparatus including an AC supply, a load and at least two conductors connecting said load to said supply, the improvement of a generator for generating pulses on said conductors, comprising a breakdown device and a capacitor connected in series and adapted to be connected across said conductors, said device having a breakdown voltage at which it conducts, heat sensitive variable impedance means connected to have a potential applied thereto, said impedance means being adapted to be mounted in heat transfer relation with said load, said impedance means having a first resistance at normal load temperatures and a second resistance at high load temperatures, said impedance means being connected to said breakdown device to apply a potential thereacross, said potential at said first resistance being less than said breakdown voltage but being greater than said breakdown voltage at said second resistance, whereby said breakdown device conducts and thereby generates current pulses on said conductors only at high load temperatures.

17. Apparatus as in claim 16, wherein said variable impedance means is adapted to be connected to have AC line power applied thereto.

18. Apparatus as in claim 16, wherein said variable impedance means increases in resistance with an increase in the temperature thereof and is connected in parallel with said breakdown device.

19. Apparatus as in claim 18, wherein said variable impedance means comprises at least one PTC resistor.

20. Apparatus as in claim 16, wherein said breakdown device comprises spark-gap means.

21. Apparatus as in claim 16, wherein said breakdown device comprises a TRIAC and a DIAC, said DIAC being connected to the gate of said TRIAC.

* * * * *